United States Patent [19]

Banai

[11] 4,272,314
[45] Jun. 9, 1981

[54] HAND-OPERATED TENSIONING AND WELDING APPARATUS FOR THERMOPLASTIC BANDS

[76] Inventor: Andras Banai, Stresemannstr. 5, 5000 Köln 90, Fed. Rep. of Germany

[21] Appl. No.: 43,301

[22] Filed: May 29, 1979

[30] Foreign Application Priority Data

Jun. 6, 1978 [DE] Fed. Rep. of Germany ....... 2825068

[51] Int. Cl.³ .............................................. B65B 13/32
[52] U.S. Cl. .............................. 156/494; 100/33 PB; 156/499; 156/502; 156/522; 156/530
[58] Field of Search .............. 156/494, 499, 522, 502, 156/530, 579, 583.1; 100/33 PB, 29; 53/399

[56] References Cited

U.S. PATENT DOCUMENTS

| | | | |
|---|---|---|---|
| 2,982,069 | 5/1961 | England | 156/494 |
| 3,397,105 | 8/1968 | Takami | 156/494 |
| 3,944,460 | 3/1976 | Karr | 156/494 |
| 4,063,985 | 12/1977 | Kyts | 156/494 |

Primary Examiner—Michael G. Wityshyn
Attorney, Agent, or Firm—Michael J. Striker

[57] ABSTRACT

The hand-operated tensioning and welding apparatus for thermoplastic bands includes a clearance control lever pivotable in a frame, a combined control lever pivotably supported on the clearance control lever and being coupled via an overrunning coupling to a tensioning roller also supported for rotation on the clearance control lever and cooperating with a tensioning bed which is formed on the upper surface of a movable clamping member. A crank arm is supported for rotation about the axis of the combined control lever and cooperates with a delayed action coupling to drive via a linkage a movable heating element for heating the overlapping portions of the thermoplastic band, and further to drive a press ram for compressing the heated band portions and to a cutting device for severing the welded band from a supply roll.

13 Claims, 7 Drawing Figures

HAND-OPERATED TENSIONING AND WELDING APPARATUS FOR THERMOPLASTIC BANDS

BACKGROUND OF THE INVENTION

This invention relates generally to a hand-operated apparatus for welding thermoplastic bands, and more particularly it relates to a tensioning and welding apparatus including a clamping device for clamping one end of the thermoplastic band, a tensioning device including a stationary tensioning bed and a rotary tensioning roller movably supported above the tensioning bed, a flat heating element insertable between the overlapping end portion of the band, a compressing ram operable for compressing the heated ends of the band and a cutting device for severing the other end portion of the welded band from a supply roll whereby actuation levers are employed for activating the clamping device, the tensioning device, the heating element, the compressing ram and the cutting device.

A welding apparatus of this type is known from the German publication DE-OS No. 25 20 349.

Such known hand-operated welding apparatus has the disadvantage, however, that its manipulation is uncomfortable inasmuch as for tensioning the binding thermoplastic strap and for welding the overlapping ends of the strap an almost simultaneous operation of two hand levers is necessary.

SUMMARY OF THE INVENTION

It is, therefore, a general object of the present invention to overcome the aforementioned disadvantage.

More particularly, it is an object of the invention to provide an improved hand-operated welding apparatus of the above-described type in which the tensioning of the band and the welding of the overlapping ends of the band can be effected single-handed and in which the possibility of a faulty manipulation is substantially eliminated.

In keeping with these objects, and others which will become apparent hereafter, one feature of the invention resides, in a welding apparatus of the above-described type, in a combination which comprises a frame, a clearance control lever pivotally supported on the frame and coupled to the clamping device to hold one end portion of the thermoplastic band in its clamped position when the lever is rotated in one direction and to release the end portion when rotated in the other direction, a combined control lever pivotably supported on the clearance control lever, an overrunning coupling arranged between the combined control lever and the tensioning roller to rotate the latter when the combined control lever is rotated in one direction and to overrun the tensioning roller when the combined control lever is rotated in the opposite direction, and a delayed action coupling arranged between the combined control lever and the heating device, the compressing ram and the cutting device and cooperating with the overrunning coupling to activate the heating element, the compressing ram and the cutting device when the combined control lever is fully swung in the opposite direction of its movement.

In the apparatus according to this invention, it is only necessary to raise the clearance control lever in order to insert the free end of the thermoplastic band between a raised clamping piece and a stationary clamping surface and by sinking the clearance control lever this free end is firmly clamped. Thereafter, a loop of the band is formed around a piece to be tied and the overlapping portion of the band passes below the tension roller and is pretensioned and fixedly held in the tensioning device by the clearance control lever. The tensioning roller rests on the other end portion of the band but its own weight or by means of a spring. Since the tensioning roller is coupled to the clearance control lever via a combined control lever provided with an overrunning coupling, the tensioning roller is rotatable in one direction only and, therefore, the tying band can be initially tensioned by hand in the other direction. By several strokes of the combined control lever the tension of the loop of the tying band can be increased to its final magnitude. Thereafter, the combined control lever is rotated in the free wheeling or overrunning direction until the delayed action coupling abuts against a linkage coupled to the heating device, to the compressing device and to the cutting device. By continuing the turning of the combined control lever in this overrunning direction the heating element is momentarily displaced between the overlapping end portions of the thermoplastic band thereupon the heated portions are compressed by the compressing ram and the other end portion of the band is severed from a supply roll while the two welded end portions are kept compressed. By lifting slightly the clearance control lever, the tensioning roller is lifted from the welded thermoplastic band and the whole apparatus can be laterally removed from the closed loop of the band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
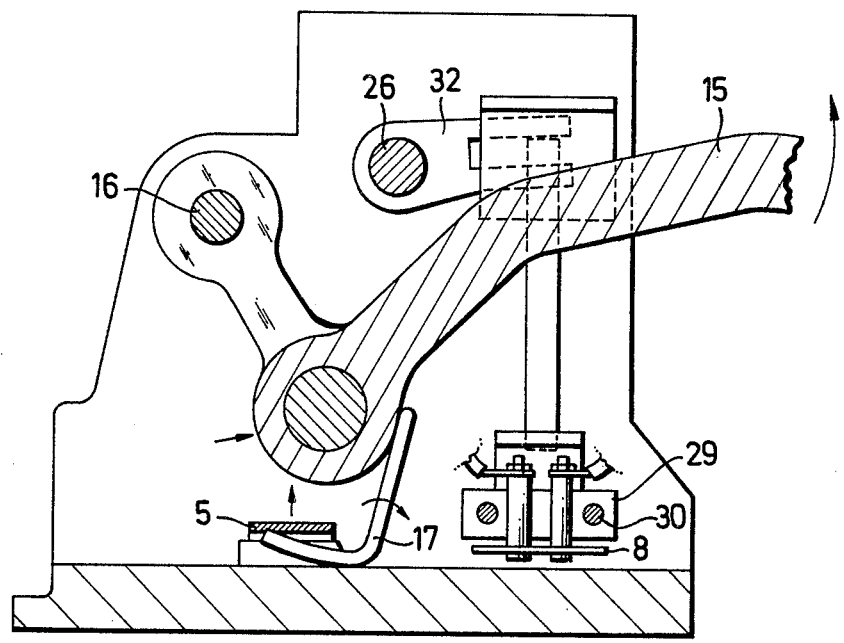
FIG. 2 is a sectional side view taken along the line II—II of FIG. 6.
Figure 3:
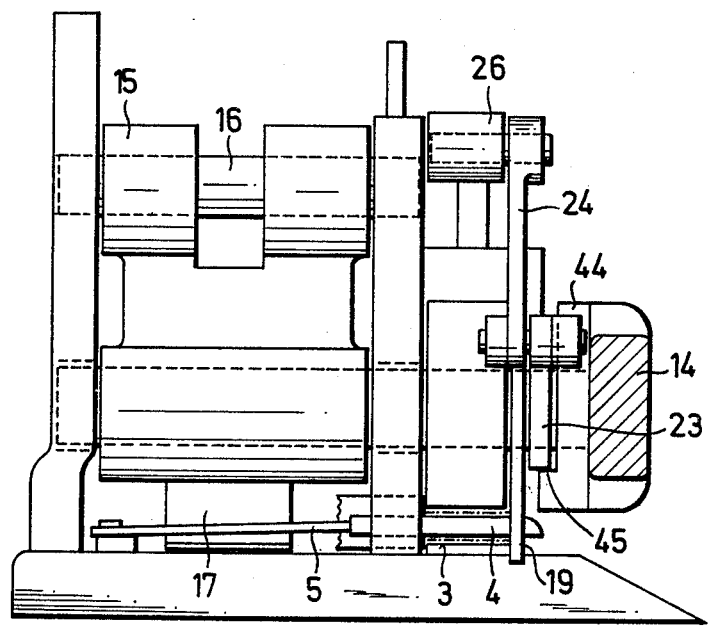
FIG. 3 is a rear (left side) view of the apparatus of FIG. 1.
Figure 5:
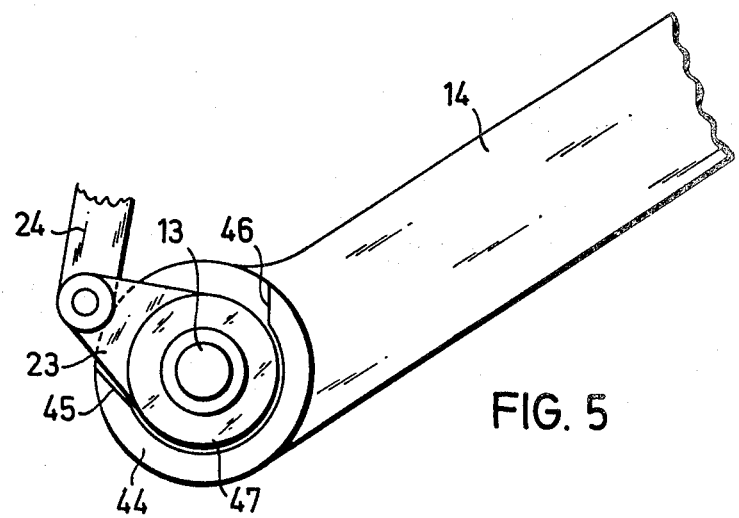
FIG. 5 is a cut-away side view of the combined control lever in the apparatus of this invention in connection with a delayed action coupling and an overrunning coupling.
Figure 6:
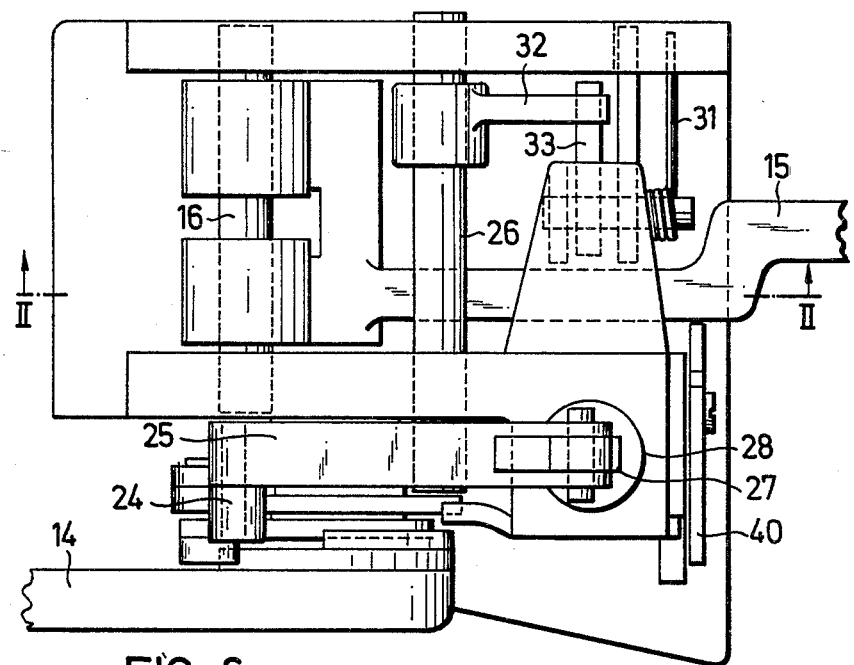
FIG. 6 is a top view of the apparatus of FIG. 1.

Referring to the drawings, the hand-operated welding apparatus of this invention serves for welding overlapping end portions of a thermoplastic binding band 1. The free end portion 2 of the band 1 is first inserted between a stationary clamping surface 3 on the frame of the apparatus and a movable clamping piece 4. By moving the clamping piece 4 down, the free end 2 of band 1 is thus firmly clamped against the surface 3. Thereafter, the band 1 is wound around the piece to be packed and the other end of the loop is laterally inserted between a tensioning bed 6 on top of the piece 4 and a tensioning roller 7 which on its periphery is provided with small gripping teeth. By displacing the tensioning roller downwardly the overlapping end of band 1 is held in a fixed position on the bed 6. The loop can now be tightened by pulling the projecting portion of band 1 by hand because the tensioning roller 7 is connected to a combined control lever 14 via a free wheeling or overrunning coupling 47 (FIG. 5) which permits the rotation of the roller 7 in one direction but blocks this rotation in the other direction. The combined control lever 14 is connected to an axle 13 which is supported for rotation on the clearance control lever 15. If the axle 13 is rotated by the combined control lever 14 counterclockwise, the overrunning coupling 47 which blocks the rotation of the tensioning roller 7 in this counterclockwise direction causes the gripping teeth of the latter to engage the loop of the band 1 and according to the movement of the lever 14 the roller 7 slidably advances the band portion in the tensioning bed 6. As soon as the desired tension of the band loop is attained, the combined control lever 14 is rotated clockwise. A delayed action coupling 44 (FIGS. 3 and 5) having two stop surfaces 45 and 46 arranged on the layer 14 around the axle 13 and spaced apart at least about 20°, abuts with the stop surface 45 against a crank arm 23. The crank arm 23 is supported for rotation about the axle 13 and is coupled via a link 24, a rocking lever 25 and a link 27 to a compressing ram 9 and a movable cutting edge 12 of a cutting device 11 and 12. The crank arm 23, as shown in FIG. 2, is further coupled via the axle 26 of rocking lever 25 to a fork arm 32 which engages a two-arm lever 33 which is pivotable about an axle 34. The long or driving arm of the lever 33 is coupled to a carriage 29 which supports a slidable heating element 8.

By continuing the movement of the combined control lever 14 in clockwise direction, the flat heating element 8 is shifted between the overlapping end portions of the band loop to be welded and immediately before the compressing ram 10 is actuated the heating element is returned to its starting position by a return spring 31 and the compressing ram 10 compresses the heated overlapping ends of the band one against the other. An edge 12 of the pressing ram 10 is formed as a movable cutting edge which cooperates with a fixed knife 11 secured to the frame of the apparatus.

To insure that band 1 could not laterally slip out of the welding apparatus, there are provided a tiltable guiding plate 19 and a guiding pawl 40 which open upon the lifting of the clearance control lever 15.

Figure 1:
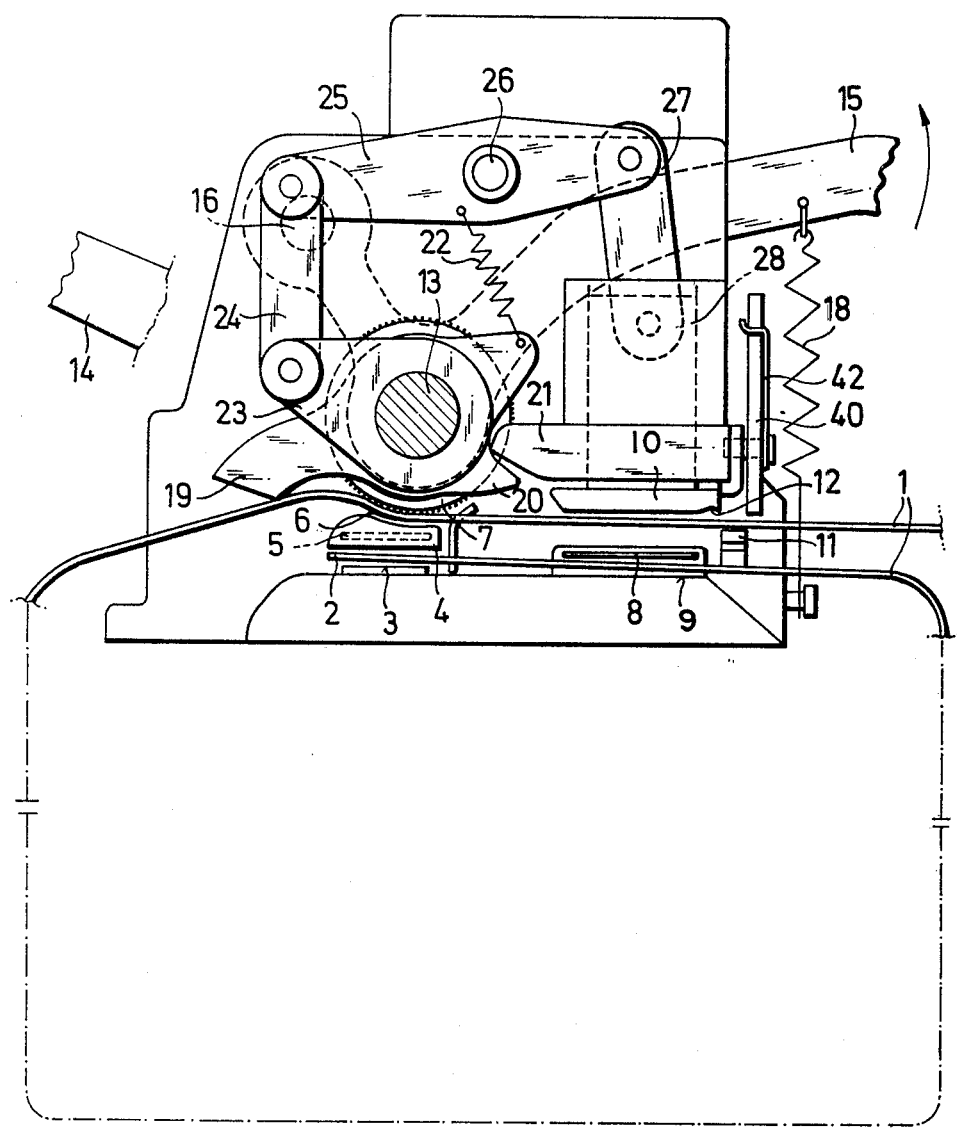
FIG. 1 is a side view of the hand-operated welding apparatus of this invention shown with an open clamping device and an open tensioning device.
Figure 4:
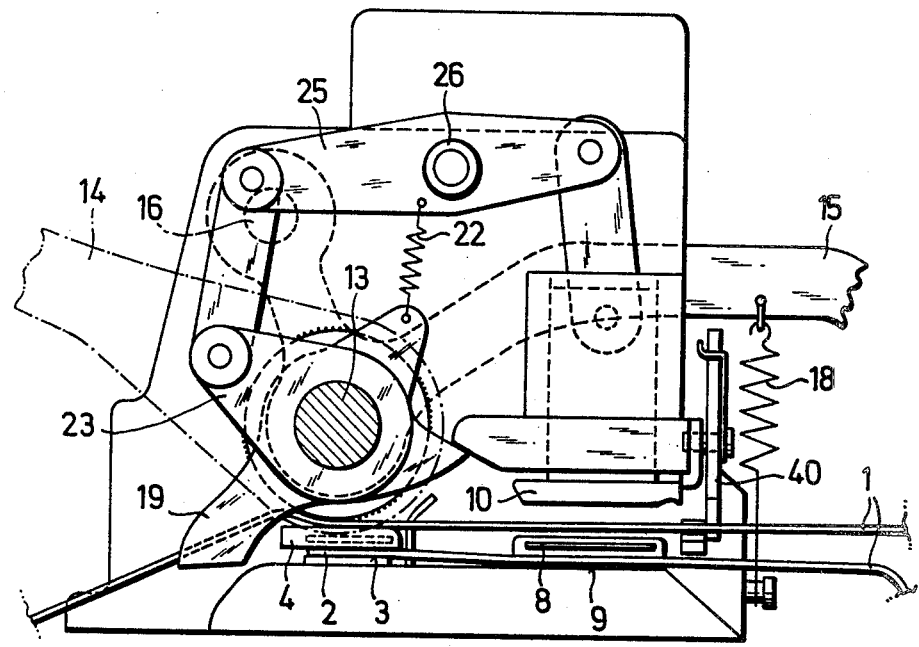
FIG. 4 is a view similar to that of FIG. 1 shown with the closed clamping device and the closed tensioning device.

As seen particularly from FIG. 2, the clearance control lever 15 is supported for rotation about an axle 16 fixed to the apparatus frame. As mentioned above, the axle 13 of the combined control lever 14 and of the tensioning roller 7 is rotatably supported on the clearance control lever 15. As shown in FIGS. 1 and 4, the guiding plate 19 is also supported for rotation about the axle 13 and is biased into its closing position by a return spring 22. If the clearance control lever 15 is moved up against the force of spring 18, as illustrated in FIG. 1, a nose 20 of the profiled guiding plate 19 abuts against a fixed stop 21 and consequently the guiding plate 19 is turned into its open position as shown in FIG. 1. As soon as the clearance control lever 15 is moved down as illustrated in FIG. 4, the return spring 22 returns the guiding plate 19 into its normal, closed position.

Figure 7:
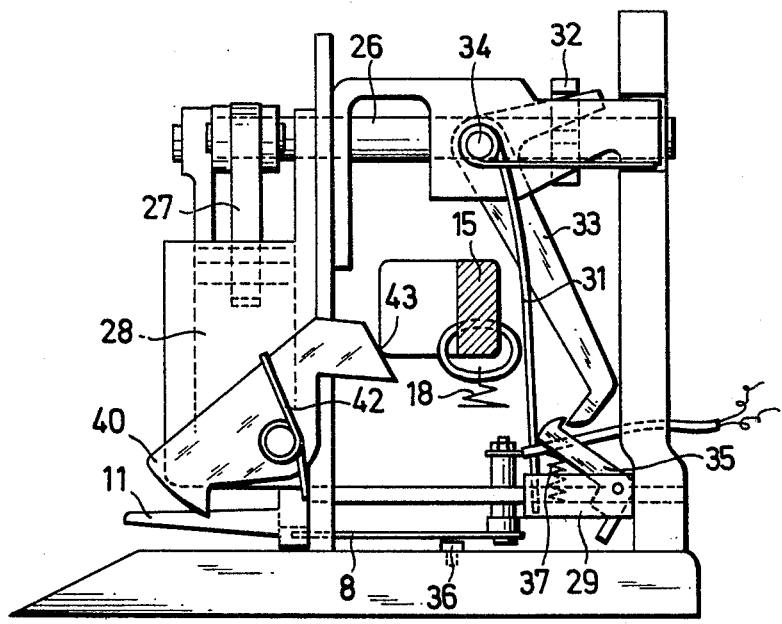
FIG. 7 is a front (right side) view of the apparatus of FIG. 1.

Referring now to FIG. 7, the guiding pawl 40 is pivotable about an axle 41 and is urged by a return spring 42 into its open position. If the clearance control lever 15 is moved upward, a biasing spring 42 urges the pawl 40 to rotate clockwise and to open the lateral entrance into the apparatus to receive the band. If, however, the clearance control lever 15 is moved downwardly, an edge of this lever acts against an inclined control surface 43 and bring the pawl 40 into its closing position.

As seen from FIG. 7, the two-arm lever 33 is coupled via a control pawl 35 to a carrier 29. The pawl 35 is pivotally supported on the carriage 29 and spring-biased by a spring 37. If the carriage 29 is moved by the lever 33 to the left, a downwardly projecting arm of the control pawl 35 is pushed against an adjustable stop member 36 in the frame of the apparatus so that the control pawl 35 is turned downwardly out of engagement from the driving lever 33 and the return spring 31 promptly returns the carriage 29 to the right into its starting position.

Upon returning the combined control lever 14 in the tensioning direction, the two-arm lever 33 also returns into its starting position in which it reengages the control pawl 35 which in its normal position is urged by the biasing spring 37 upwardly into engagement with the tip of the lever 33.

By turning the clearance control lever 15 upwardly about the axle 16, the tensioning roller 7 is firstly lifted about 3 millimeters above the tensioning bed 6. As explained previously, the lateral guiding plate 19 and the guiding catch or pawl 40 are rotated upwardly to such an extent that the lateral entrance for the band 1 is opened. By continuing the upward movement of the clearance control lever 15, the latter tilts an angular lever 17 which is arranged in contact with a downwardly biasing lead spring 5 for the movable clamping member 4. The tilted lever 17 urges the leaf spring 5 upwardly so that the clamping piece is lifted off the clamping surface 3. The resulting clearance in the clamping device 3 and 4 enables the insertion of the starting end portion 2 of the band on the clamping surface 3. By releasing the clearance control lever 15, spring 5 is also released and presses the clamping piece 4 against the band portion 2 on the clamping surface 3. Subsequently, the other end portion of the band loop is inserted between the tensioning bed 6 and the tensioning roller 7. By completely releasing the clearance controlling lever 15, the latter is pulled downwardly by the return spring 18 and clamps the other end portion of the loop between the tensioning bed 6 and the tensioning roller 7. The loop of the band 1 can now be readily pretensioned by pulling by hand the outwardly projecting part of the band 1. The final tension of the band loop is achieved by several strokes of the combined control lever 14 which tensions the thermoplastic band 1 via the free wheeling or overrunning coupling 47 connected to the tensioning roller 7.

Thereupon, the combined control lever 14 is turned to the right in the free wheeling direction of the coupling 47 to a point where it encounters the pressure of the strong resetting spring 31. By continuing this movement of lever 14 against the spring 31, the stop 45 turns via the crank arm 23 and the like 24, the rocking lever 25 which, via a link 27, displaces the press ram 9 together with the cutting edge 12 downwardly. Simultaneously, the shaft 26 of the rocking lever 25 rotates the fork arm 32 against the short arm of the driving lever 33. The lever 33 rotates about an axle 34 extending at right angles to the shaft 26 of the rocking arm. The long arm of the driving lever 33, as described above, displaces the heating element 8 between the overlapping end portions of the thermoplastic band located below the press ram 10.

Before the press ram 10 compresses the two end portions of the band, the pawl 35 on the carriage 29 of the heating element 8 disengages the long arm of the driving lever 33 and the carriage with the heating element 8 is promptly returned to the strongly tensioned spring 31 to its initial position.

To bring the long arm of the driving lever 33 again into engagement with the control pawl 35 on the carriage 29, the combined control lever 14 has to be completely returned in the tensioning direction until the stop 46 abuts against the crank arm 23 and rotates the latter counterclockwise. By virtue of this counterclockwise movement all parts 24–33 as well as the press ram 9 are returned into their respective starting positions.

It will be understood that each of the elements described above, or two or more together, may also find a useful application in other types of constructions differing from the types described above.

While the invention has been illustrated and described as embodied in a welding apparatus for thermoplastic bands, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hand-operated welding apparatus for bands of thermoplastic material, including clamping means for clamping one end portion of the band, tensioning means for forming a loop of said band above said one end portion, means for heating overlapping portions of said loop, means for compressing the heated overlapping portions, and means for cutting the other end portion of the band, a combination comprising a frame; a clearance control lever pivotably supported on said frame and coupled to said clamping means and said tensioning means to open said clamping and tensioning means when rotated in one direction and to close said clamping means and said tensioning means when rotated in the other direction; a pivotable combined control lever pivotally supported on said clearance control lever; over-running coupling means arranged between said combined control lever and said tensioning means to activate the latter during the rotation of said combined control lever in said one direction and to overrun said tensioning means when said combined control lever is rotated in the opposite direction; delayed action coupling means cooperating with said combined control lever; and a linkage arranged between said delayed action coupling and said heating means, said compressing means and said cutting means to activate successively the heating, compressing and cutting means when said combined control lever is swung in said opposite direction, so that said combined control lever is operative for tensioning, welding and cutting said band.

2. The combination as defined in claim 1, wherein said clamping means includes a stationary clamping surface, a clamping member arrangement for movement above said clamping surface and a biasing spring for urging said clamping member against said clamping surface.

3. The combination as defined in claim 2, wherein said biasing spring is a leaf spring.

4. The combination as defined in claim 2, wherein said clamping member is of a synthetic material.

5. The combination as defined in claim 2, wherein said tensioning means includes a tensioning bed formed on the upper surface of said movable clamping member and a tensioning roller supported for rotation on said clearance control lever.

6. The combination as defined in claim 5, wherein said tensioning bed has a convex shape corresponding to the circumference of said tensioning roller.

7. The combination as defined in claim 1, wherein said heating means includes a movable carriage spring-biased into a starting position, and on said carriage, a spring-biased pawl and a heating element, and said linkage including a crank arm cooperating with said delayed action coupling and a two-arm lever having a driving arm cooperating with said control pawl on said carriage to drive the latter toward said clamping and tensioning means when said delayed action coupling is rotated by said combined control lever, and means for disengaging said driving arm from said control pawl when said carriage is displaced to a predetermined position.

8. The combination as defined in claim 7, wherein said delayed action coupling has abutments cooperating with said crank arm.

9. The combination as defined in claim 7, wherein said combined control lever, said crank arm and said tensioning roller are connected to a common axle, said axle being supported for rotation in said clearance control lever.

10. The combination as defined in claim 9, further including a guiding plate supported for rotation about said common axle and being spring-biased into a closing position, said guiding plate defining a control nose and an abutment engaging said clearance control lever to lift said guiding plate into an open position when said clearance control lever is lifted.

11. The combination as defined in claim 10, further including a guiding pawl pivotably connected to said frame in the proximity of said cutting means and being coupled to said clearance control lever to take an open position when said clearance control lever is lifted.

12. The combination as defined in claim 7, wherein said compressing means includes a movable press ram coupled to said linkage to compress the heated overlapping portions of said band.

13. The combination as defined in claim 12, wherein said cutting means includes a stationary knife and a cutting edge provided on said press ram to cooperate with said knife.

* * * * *